United States Patent [19]

Lambros et al.

[11] 4,237,365
[45] Dec. 2, 1980

[54] COMBINATION ARC BRAZING AND WELDING ELECTRODE HOLDER

[75] Inventors: William S. Lambros, St. Louis; James I. Metzger, Jr., Manchester, both of Mo.

[73] Assignee: Emerson Electric Co., St. Louis, Mo.

[21] Appl. No.: 966,787

[22] Filed: Dec. 6, 1978

[51] Int. Cl.³ .................... B23K 9/28; H05B 7/101
[52] U.S. Cl. .................... 219/139; 219/129; 219/140
[58] Field of Search ............... 219/138, 139, 140, 161, 219/129

[56] References Cited

U.S. PATENT DOCUMENTS

| | | | |
|---|---|---|---|
| 1,345,817 | 7/1920 | Williams | 219/138 |
| 1,552,244 | 9/1925 | Thomas | 219/138 |
| 1,989,901 | 2/1935 | Villars | 219/138 |
| 2,266,239 | 12/1941 | Nielsen | 219/139 |
| 2,300,203 | 10/1942 | Campbell | 219/139 |
| 3,483,348 | 12/1969 | Jenkins | 219/140 X |

*Primary Examiner*—B. A. Reynolds
*Assistant Examiner*—Keith E. George
*Attorney, Agent, or Firm*—Polster, Polster and Lucchesi

[57] ABSTRACT

A combination arc brazing and welding electrode holder for use with welding apparatus for holding a pair of brazing electrodes in proper arc striking and arc maintaining relation or for holding an arc welding electrode. The holder has a pair of hinged handle parts swingable between an open and a closed position and each of the handle parts carries an electrode holding clamp. One of the holding clamps together with its power lead is readily removable from its handle part so that it may be attached to a work piece remote from the holder thereby to constitute a grounding lead for electric arc welding. The holding clamps are so constructed as to wedgingly hold a range of sizes or diameters of electrodes.

18 Claims, 12 Drawing Figures

COMBINATION ARC BRAZING AND WELDING ELECTRODE HOLDER

BACKGROUND OF THE INVENTION

This invention relates to a combination arc brazing torch and an arc welding electrode holder, and more particularly to such a combination electrode holder for use primarily with a welding power supply unit for use in a home work shop, garage, or farm.

Heretofore, arc welding apparatus has oftentimes been provided with a combination arc brazing torch and arc welding electrode holder. However, these prior combination electrode holders were difficult to manufacture and were, in many instances, too large and expensive for ready and economical application with smaller, inexpensive, light duty electric welding units.

In prior electrode holders, a spring loaded jaw-type clap has typically been used to clamp the electrodes in place on the holder. However, these prior electrode clamps were of necessity ruggedly constructed so as to hold the electrode firmly in place. The rugged design and construction of these prior electrode holding clamps resulted in electrode holders which were too expensive to use with smaller, less costly arc welding units. Still other less expensive electrode holders were known which used a screw-type clamp to hold the electrode in place. However, these screw-type clamps were cumbersome to operate, particularly when the user was wearing gloves, and were subject to being damaged (and thus eventually rendered inoperable) by their being spattered with droplets of molten metal during welding or by arcing if the welding electrode would inadvertantly be pulled from the holder during welding as may be occasioned by the electrode sticking to the work piece.

When using the holder as an arc brazing torch, it is necessary that a pair of carbon (i.e., graphite) electrode rods be held by the holder such that the ends of the electrode rods are spaced a desired distance so as to strike and to maintan an electric arc therebetween. In order to accomplish this, it is necessary that the electrode holder be capable of accurately adjusting the electrodes relative to one another and yet that the electrodes can be fed out as they are consumed. In certain of the prior art brazing torches, it was relatively difficult to adjust the relative position of the electrode rods.

Also, it was oftentimes necessary to securely hold a range of electrode sizes (i.e., range of electrode diameters). For example, the ends of electrodes to be clamped in the holder may vary in diameter from 1/16 to ¼ inch (1.6 to 6.4 mm.). If the electrodes are not securely held in place by the holder, good electrical contact will not be maintained between the holder and the electrode and arcing may result with consequent damage to the electrode holder.

SUMMARY OF THE INVENTION

Among the several objects and features of the present invention may be noted the provision of a combination arc brazing torch and arc welding electrode holder for use with a welding power supply which securely holds a range of sizes of welding or brazing electrodes;

The provision of such a holder which when used as an arc brazing torch securely and accurately holds a pair of carbon arc electrodes in arcing relation with one another so as to enable the user readily to strike and to maintain an arc;

The provision of such a holder which permits ready adjustment of the space or gap between the arch brazing electrodes, which securely holds them in position, and yet which permits them to readily be fed as the electrodes are consumed;

The provision of such a holder which permits electrodes of various sizes (i.e., diameters) to be readily inserted therein and to be securely held thereby;

The provision of such a holder which readily holds a range of sizes of electrodes and in which electrodes of different sizes can be used without any adjustment to the holder;

The provision of such a holder which readily permits the user to strike an arc between a pair of arc brazing electrodes and to readily maintain the arc while brazing;

The provision of such a holder which is comfortable to use and which is light in weight;

The provision of such a holder which minimizes the transfer of heat to the user's hand during welding or brazing;

The provision of such a holder which may be readily converted from an arc welding electrode holder to an arc brazing electrode holder or vice versa;

The provision of such a holder which prevents the arc brazing electrode clamps from contacting one another and from shorting out with consequent arcing therebetween; and The provision of such a holder which is readily and inexpensively manufactured, which is easy to use, and which is safe and reliable in operation.

Briefly, a combination arc brazing and arc welding electrode holder of this invention comprises a handle having two handle parts pivotally joined together at one end thereof, constituting the rear end of the handle, for swinging toward and away from one another between an open position in which the front ends of the handle parts are spaced apart and a closed position in which the handle parts are substantially together whereby both the handle parts may be readily gripped by one hand. An electrode holding clamp is secured to the front end of each of the handle parts and each of these clamps comprises a pair of hinged jaws pivotally movable toward and away from one another and a spring for resiliently biasing the jaws toward their closed position. Each of the jaws has a hole therethrough for reception of an electrode, these holes being larger than the diameter of electrodes. The hole in one of the jaws is located at one distance from the hinge point of the jaws and the hole of the other jaw being located at another distance from the hinge point of the jaws so that with the jaws open and an electrode inserted through both of these holes in the jaws, the electrode is wedgingly clamped in the jaws upon the jaws moving toward one another under the bias of the spring thereby to securely hold the electrode in place.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
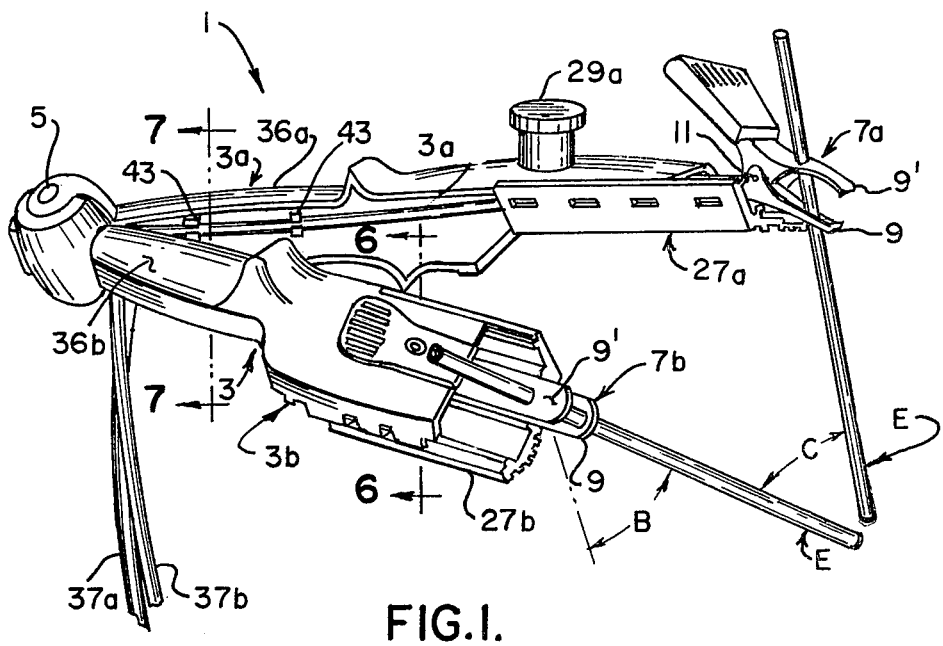
FIG. 1 is a perspective view of a combination arc brazing and arc welding electrode holder of this invention having a pair of handle parts shown in an open position with each handle part carrying an electrode clamp for holding a respective arc brazing electrode.
Figure 2:
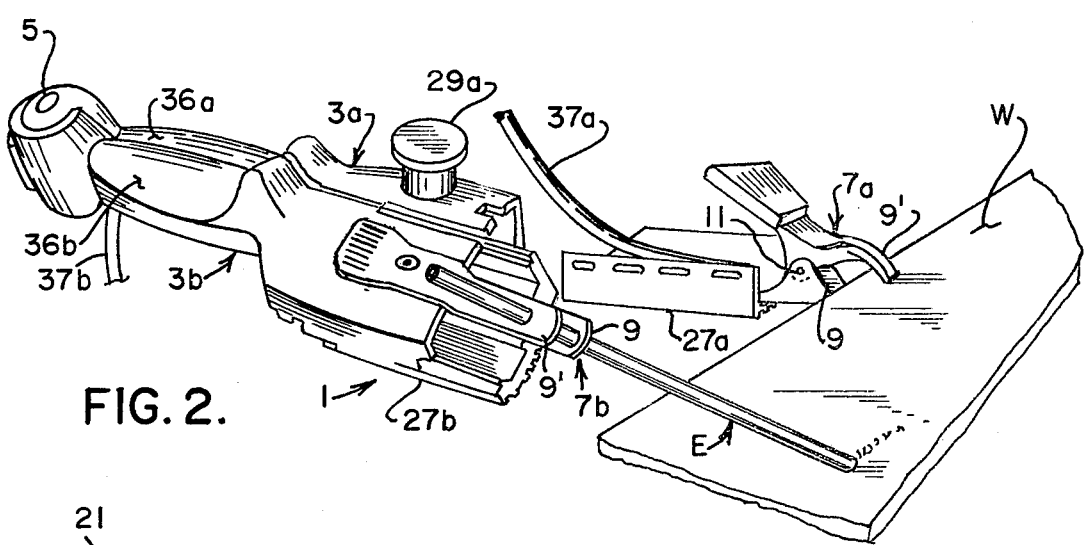
FIG. 2 is a perspective view of the handle similar to FIG. 1 showing the handle parts in their closed position with one of the electrode holding clamps removed from its respective handle part and attached to a work piece so as to constitute a grounding lead for arc welding.

Referring now to the drawings, a combination arc brazing and arc welding electrode holder is shown to be indicated in its entirety at reference character 1. In FIG. 1, the electrode holder is shown to be configured for use as an arc brazing torch (also known as an arc brazing electrode holder) and, in FIG. 2, it is shown to be configured as an arc welding electrode holder.

Figure 3:
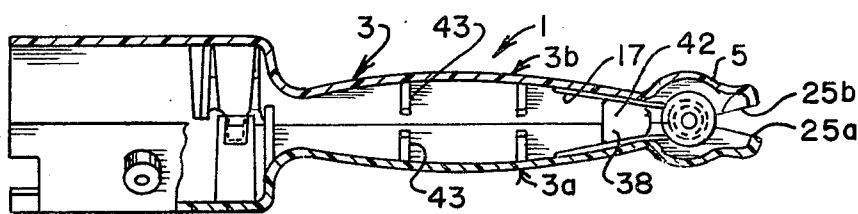
FIG. 3 is a horizontal, longitudinal cross sectional view of the holder shown in FIG. 2.
Figure 4:
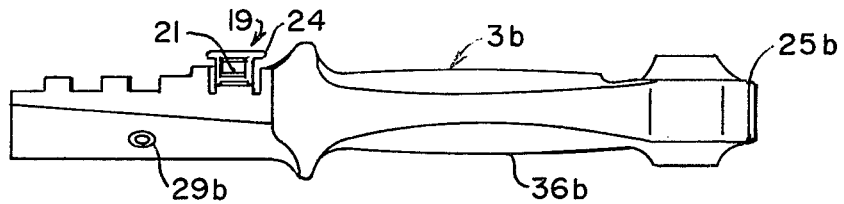
FIGS. 4 and 5 are side elevational views of the handle parts of the holder.
Figure 5:
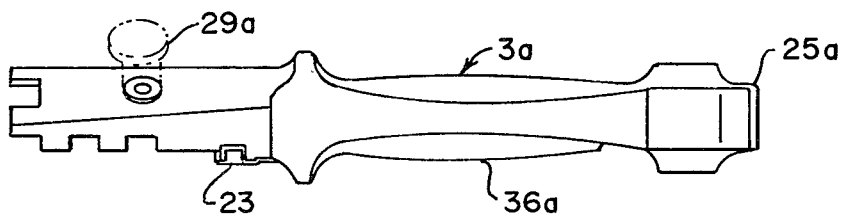

More specifically, electrode holder 1 comprises a handle generally indicated at 3 having two handle parts 3a and 3b pivotally joined together by a hinge, as indicated at 5, at the rear ends of the handle parts. Thus, the handle parts are swingable relative to one another between an open position (see FIG. 1) in which the front ends of the handle parts 3a, 3b are spaced apart and a closed position (see FIGS. 2 and 3) in which the handle parts are together in substantially side-by-side relation whereby the user of the electrode holder may readily grip both of the handle parts in one hand for convenient use. Each of the handle parts 3a, 3b has a respective electrode clamp, as generally indicated at 7a, 7b, secured to the front end thereof. Each of these clamps is generally referred to as a "alligator"-type clamp and each has a pair of opposed jaws 9, 9' made of copper or other electrically conductive metal hinged together by a hinge pin 11 for pivotal or swinging movement toward and away from one another between a closed position (see FIG. 10) in which the jaws are together and an open position. Each clamp includes a spring 13 for resiliently and forceably biasing the jaws toward their closed position.

Figures 9, 10:
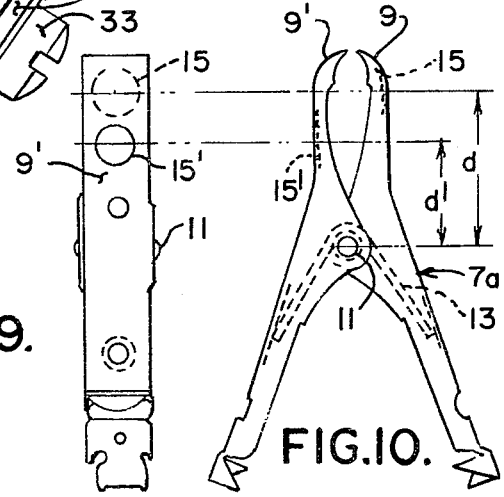
FIG. 9 is an edge view of one of the electrode holding clamps.
FIG. 10 is a side elevational view of one of the electrode holding clamps in its closed position.
Figure 11:
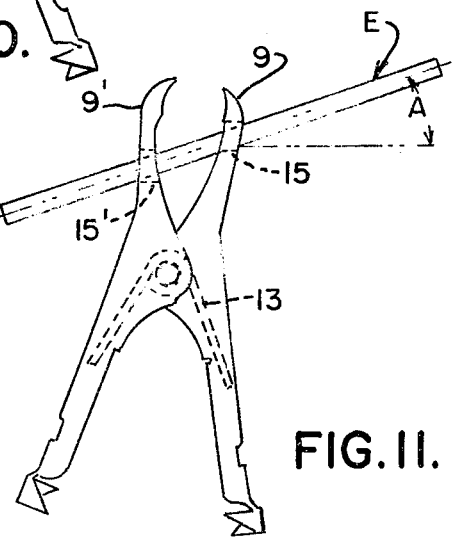
FIG. 11 is a view similar to FIG. 10 showing the holding clamp in its open position with an electrode inserted therein and being wedgingly gripped thereby.

As best shown in FIGS. 10 and 11, and in accordance with this invention, each of the jaws 9, 9' of each of the clamps 7a, 7b has a respective electrode receiving hole 15, 15' therein. These holes are shown to be circular holes although holes of other shapes may also be satisfactory. These circular holes are shown to have a diameter slightly larger than the diameter of the electrode to be received therein. Hole 15 in jaw 9, as shown in dotted lines in FIG. 9, is shown to be located a distance d from hinge pin 11 and hole 15' in jaw 9' is located a distance d' from the hinge pin wherein the distance d is somewhat greater than the distance d'. Thus, with the jaws of the clamp open and with an electrode E inserted into both holes 15 and 15' of one of the one of the clamps 7a or 7b, the jaws of that clamp will wedgingly clamp or grip the electrode upon release of the clamp and upon at least partial closing of the jaws under the bias of spring 13 (see FIG. 11).

Still further in accordance with this invention, clamps 7a, 7b are intended to securely clamp a range of electrode sizes or diameters. For example, the diameters of the ends of electrodes which can be clamped utilizing these electrodes clamps may range between about 1/16 and ¼ inch (i.e., between 1.6 and 6.4 mm.), and the hole 15 in jaw 9 may have a diameter of about 0.28 inches (7.1 mm.) and hole 15 and jaw 9 may have a diameter of about 0.31 inches (7.8 mm.). As shown in FIG. 9 dimension d' is about 0.69 inches (17.5 mm.), and dimension d is about 1.03 inches (26.2 mm.) so that the offset between them is about 0.34 inches (8.6 mm.). As can be best seen in FIG. 11, with the end of an electrode E inserted into holes 15' and 15 of clamp jaw 9' and 9 of clamp 7a and with the clamp release, its spring 13 forces the clamping jaws closed. Because of the offset of holes 15 and 15', the clamp wedgingly secures electrode E in place and automatically accommodates any variations in size (i.e., diameter) differences between the electrodes and the holes. Also due to the offset, the electrode angles outwardly away (i.e., forwardly) from the outer end of its respective handle part 9 at an angle, as indicated at A in FIG. 11. As shown, angle A is about 30 degrees, however, it will be understood that this angle could and may vary depending on the diameter of the electrodes being clamped and the offset distance between the holes. For example, angle A could range from about 15 and 60 degrees. However, this is not to be taken as a limitation of the scope of this invention.

A hole (not shown) of a different size from the hole 15' may be provided in handle part 9' to further increase the range of sizes of electrodes accommodated.

Figure 12:
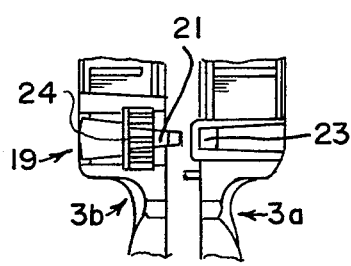
FIG. 12 is a bottom view of a portion of the holder illustrating releasable means for automatically locking the handle parts together in their closed position upon closing the handle parts.

As heretofore mentioned, handle parts 3a, 3b are hinged together by a hinge 5 at the rear ends thereof. A spring 17 (see FIG. 3) biases the handles parts toward their open position, as shown in FIG. 1. To hold the handle parts in their closed position against the bias of the spring, a releasable locking assembly is provided as generally indicated at 19 in FIG. 12. Handle part 3b has a resiliently deformable detent clasp 21 which snaps into a catch 23 formed in handle part 3a when the handle parts are squeezed closed thereby to positioned hold the handle parts closed against the bias of spring 17. Clasp 21 has a thumb button 24 thereon which when pressed inwardly releases the clasp from its catch to permit the handle parts to be opened. Other closure means, such as a threaded bolt and knob joining the handle parts 3a and 3b and permitting the space between them to be adjusted or closed, are compatible with the broader aspects of this invention.

A portion of each of the handle parts 3a, 3b extends rearwardly of hinge pin 5, as respectively indicated at 25a and 25b. When the electrode holder is in the open position, the inner faces of these rear handle portions bear against one another and thus effectively present the further opening movement of the handles beyond a desired fully open position, as shown in FIG. 1.

Figure 6:
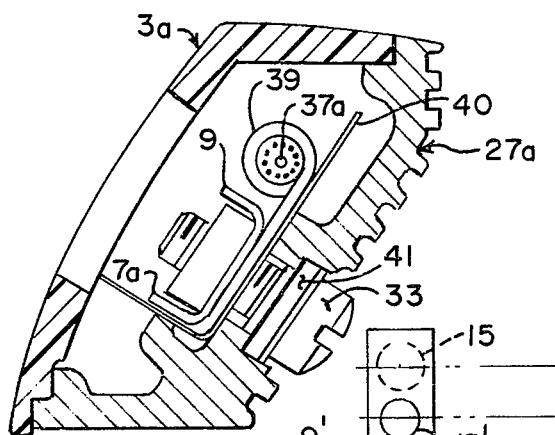
FIG. 6 is an enlarged cross sectional view taken along line 6—6 of FIG. 1.
Figure 8:
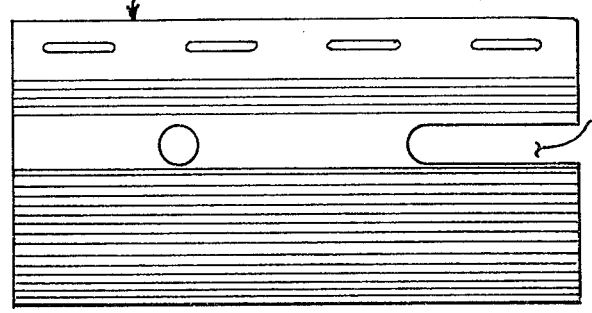
FIG. 8 is a bottom plan view of one of the heat shields on which an electrode holding clamp is mounted.

Each clamp 7a, 7b is rigidly mounted on a respective heat shield 27a, 27b made of aluminum or other suitable material. As shown in FIG. 6, the heat shields are each generally channel-shaped in cross section and are held in place on the outer end of their respective handle parts 3a, 3b so as to properly mount their respective electrode clamp 7a, 7b. Heat shield 27b is held in place on its handle part 3b by a screw 29b and heat shield 27a is removable secured to its handle part 3a by means of a clamping screw and knob 29a so that shield 27a together with its clamp 7a may be removed or installed from handle part 3a as a unit. More specifically, heat shield 27a (see FIG. 8) has a slot 31 therein which receives clamping screw and know 29a so that upon inserting the heat shield in proper position on its handle part 3a, the clamping screw is received in slot 31 whereupon tightening the clamp screw will clamp the heat shield in place on the handle part. In addition, the heat shield 27a together with its clamp 7a may be moved toward or away from the end of the handle within limits permitted by the slot 31 in order to permit adjustment of the alignment between the two electrodes. As shown in FIG. 6, clamp 7a is secured to its heat shield by a screw 33 and the clamp jaw 9 fits down in a groove provided in the heat shield. Clamp 7b is secured to its heat shield 27b in a similar manner. Power leads 37a and 37b are electrically connected to their respective clamps 7a or 7b by means of a wire terminal 39 held in place by screw 33 (see FIG. 6). A piece of electrical insulation material 40 is disposed between each clamp 7a, 7b and its heat shield 27a, 27b so as to electrically insulate the heat shields from power leads 37a, 37b. In addition, a shouldered washer 41 made of electrical insulation material is provided under the head of screw 33 so as to electrically insulate the heat shields from the screw 33. It will be appreciated that in the event that heat shields 27a, 27b come into contact with one another that they are electrically insulated from their leads and thus arcing will not occur.

Figure 7:
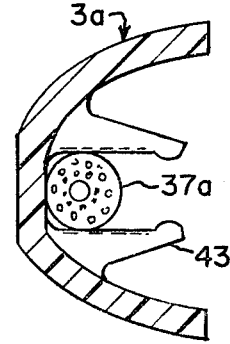
FIG. 7 is a cross sectional view of one of the handle parts taken along line 7—7 of FIG. 1.

Handle parts 3a and 3b are preferably molded of a suitable synthetic resin material which is also a good electrical insulator. For example, the handle parts may be molded of a glass filled nylon resin. Each of the handle parts has a grip portion 36a, 36b formed to permit handy and comfortable gripping of the holder by the user whenever the handle parts are in their closed position (see FIG. 2) for use as a welding electrode holder or in their open position (see FIG. 1) for use as a brazing arc electrode holder. As shown best in FIGS. 1 and 2, power leads 37a, 37b enter holder 1 at the rear end thereof through openings 42 (see FIG. 3) in the bottom of the handle parts. The leads then extend through their respective handle parts and are connected to their respective clamps 7a, 7b via the above-mentioned wire terminals 39. The leads are held in place within their respective handle parts by means of wire holding clips 43 (see FIG. 7) molded in place within the handle parts. These wire holding clips include two spaced fingers toward one another which are spaced somewhat closer than the outer diameter of the power lead to be received therein. Thus, upon inserting the power lead between the fingers, the fingers are forced to flex outwardly and/or the insulation on the power lead 37a is forced to compress slightly so as to allow the power lead to be pushed into the space betwen the fingers and thus the power lead is resiliently held in place by the clip. In regard to the handle part 3a and removable clamp 7a, the power lead clips 43 therein allow the power lead 39a to clamp 7a to be readily stripped from its handle part 3a so that clamp 7a may be readily connected to work piece W remote from the electrode holder 1. Thus, especially when holder 1 is used as a welding electrode holder, the holder is not encumbered by a ground lead attached to the handle. Also, this permits the clamp 7a to serve a double function as not only an arc brazing torch electrode holder, but it also serves as the grounding clamp and lead assembly thus eliminating the necessity of supplying a completely separate grounding lead assembly.

When the holder of this invention is desired to be used as an arc brazing torch, the handle parts are separated from one another by unsnapping locking arrangement 19 and thus allowing spring 17 to bias the handle parts away from one another toward their open position. As the rear end portions 25a, 25b of the handle parts engage one another, the handle parts are prevented from opening from beyond their fully open position as shown in FIG. 1. With removable clamp 7a and its heat shield 27a secured in place on the outer end of handle part 3a, a pair of arc brazing electrodes E may be inserted in the holder, shown in FIG. 1. More specifically, a respective electrode E is inserted into holes 15' and 15 of jaws 9' and 9 of each of the electrode clamps 7a and 7b and adjusted so that the outer ends of the electrodes are in close arc striking proximity to one another. As mentioned above, the electrodes angle out from the front of the holder at an angle A. This places the arc struck between the electrodes at some distance in front of and below the position of the user's hand. As will be further noted especially in FIG. 1, electrode clamps 7a and 7b are rotated with respect to the longitudinal axis of their respective handle parts so that electrodes supported by these electrode clamps angle inwardly toward one another. For example, these electrodes may angle inwardly at substantially the same angle B (e.g., 30 degrees) so that the electrodes meet and have approximately an included angle C therebetween of about 60 degrees (see FIG. 1). It will be understood that angles B and C could vary considerably and still be within the scope of this invention. For example, angle C may range between about 30–90 degrees or more.

During operation of the welding apparatus for arc brazing purposes, electrodes E will be slowly consumed. In use, the electrodes must be periodically fed forward as they are consumed. When the electrodes have been substantially consumed, the arc must be extinguished before the arc reaches the electrode clamps so as to prevent damage to the clamps. The consumed electrodes are then replaced with new ones. It will be understood that it is a relatively easy manner to feed the electrodes toward the arc being struck therebetween merely by squeezing clamps 7a and 7b so as to open them somewhat thus releasing electrode E from the wedging grip thereof and permitting an additional length of electrode to be fed forwardly. Automatically, upon releasing the clamp, the electrode will again be wedgingly gripped by the clamp under the bias of spring 13.

Further in accordance with holder 1 of this invention, it is relatively easy for the user of the holder to strike and to maintain an arc between a pair of carbon arc brazing electrodes held thereby. With the handles open, the user partially squeezes handle parts 3a, 3b closed thus moving the tips of the electrodes together so as to strike an arc. The user may then partially open the handle parts so as to maintain or regulate the arc. Also, as the electrodes are consumed, the user may maintain the arc by moving the handle parts together.

Of course, with the aluminum heat shields 27a and 27b facing generally toward the arc struck between the brazing torch electrodes or between the welding electrode and the work piece, these heat shields serve to reflect a good deal of radiant heat away from the handle and thus prevent it from being absorbed by the handle. Also, the synthetic resin handle parts 3a and 3b are poor conductors of heat and have a relatively low heat capacity and thus feel cooler to the user of the holder.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

We claim:

1. A combination arc brazing and arc welding electrode holder comprising a pair of handle parts cooperable with one another for use either as an arc brazing electrode holder or an arc welding electrode holder, said handle parts being movable between a closed position in which said two handle parts are in closed side-by-side relation and an open position in which at least one end of said handle parts are spaced from one another, an electrode clamp carried on said one end of each of said handle parts, a power lead connected to each of said clamps, means in each of said handle parts for holding respective said power lead, one of said clamps together with its respective power lead being removable from its respective handle part, said holder being usuable as an arc brazing electrode holder when said handle parts are in their open position and when both of said clamps are carried by their respective handle parts so as to support a pair of arc brazing electrodes in proper arc striking and maintaining relation, and when said one clamp and its electrical power lead are removed from its respective handle part and when said handle parts are in their closed position so as to hold a single electric arc welding electrode and so as to be adapted for electrically grounding a workpiece to be welded.

2. A combination arc brazing torch and welding electrode holder comprising a handle having two parts pivotally joined together at one end constituting the rear end of the handle for swinging toward and away from one another between an open position in which the other or front ends of the handle parts are spaced apart and a closed position in which the handle parts are substantially together whereby both handle parts may be readily gripped by one hand, an electrode holding clamp secured to the front end of each of said handle parts, each of said clamps comprising a pair of hinged jaws pivotally movable toward and away from one another and a spring for resiliently biasing said jaws closed, each of said jaws having a hole therethrough for reception of an electrode, said holes being larger than the diameter of the electrode, the holes of one of said jaws being located at one distance from the hinge point of the jaws and the hole of the other of said jaws being located at another distance from said hinge point so that with the jaws opened and with an electrode inserted through both of said holes in said jaws said electrode is wedgingly clamped in said jaws upon said jaws moving toward one another under the bias of said spring thereby to securely hold the electrode in place, each of said clamps is made of electrically conductive metal and each has a suitable power lead secured thereto in electrical connection therewith, one of said clamps being selectively removable from its respective handle part for being clampingly secured to a work piece to be welded thereby to constitute a grounding lead.

3. A combination arc brazing torch and welding electrode holder as set forth in claim 2 wherein each of said handle parts is of a suitable synthetic resin material which is a good electrical insulator, and wherein one of said handle parts includes means for releasably securing said one clamp thereto.

4. A combination arc brazing torch and welding electrode holder as set forth in claim 3 wherein said one handle part includes means for releasably holding its respective power lead thereon so as to permit the ready removal of said power lead from said one handle part for attachment of said one clamp to said workpiece remote from said holder.

5. A combination arc brazing torch and welding electrode holder as set forth in claim 2 further comprising a spring for biasing said handle parts toward their open position.

6. A combination arc brazing torch and welding electrode as set forth in claim 5 further comprising means for holding said handle parts in a predetermined open position against the bias of said spring.

7. A combination arc brazing torch and welding electrode holder as set forth in claim 2 wherein said electrodes are so held by their respective clamps so as to form an interior angle therebetween ranging between about 30 and 90 degrees.

8. A combination arc brazing torch and welding electrode holder as set forth in claim 7 wherein said interior angle is preferably about 60 degrees.

9. A combination arc brazing torch and welding electrode holder as set forth in claim 7 wherein said electrodes angle forwardly out beyond the ends of their respective said handle parts so that the arc formed by said electrodes is below and forward of said holder.

10. A combination arc brazing torch and welding electrode holder as set forth in claim 2 further comprising means for releasably locking said handle parts together in their closed positions.

11. A combination arc brazing torch and welding electrode holder as set forth in claim 10 wherein said releasable locking means comprises a resiliently deformable clasp on one of the handle parts and a catch on the other handle part, said clasp and catch being engageable with one another upon closing of the handle parts so as to automatically lock the handle parts together in their closed positions.

12. A combination arc brazing torch and welding electrode holder as set forth in claim 10 wherein said locking means include means for automatically locking said handle parts together upon closing said handle parts.

13. A combination arc brazing torch and welding electrode holder as set forth in claim 2 wherein each of said clamps is secured to a metal member which in turn is secured to a respective handle part.

14. A combination arc brazing torch and welding electrode holder as set forth in claim 13 wherein one of said metal members together with its respective clamp is removably secured to its handle part whereby said one metal member together with its clamp may be removed from its handle part for being connected to a work piece remote from said holder thereby to constitute a grounding clamp.

15. A combination arc brazing and arc welding electrode holder comprising a handle having two parts, each of said handle parts carrying an electrode holding clamp, each of said clamps comprising a pair of hinged jaws pivotally movable toward and away from one another and a spring for resiliently biasing said jaws closed for gripping an electrode, each of said clamps having an electrical lead connected thereto, said leads being carried within the respective handle part on which its clamp is mounted, one of said clamps together with its power lead being removable from their respective handle part for attachment to a workpiece to be welded so as to constitute a grounding lead, and, when installed on its handle part, said one clamp being usable as an electrode holder for holding one of a pair of brazing arc electrodes and for supplying power thereto via its said lead.

16. A combination holder as set forth in claim 15 further including a metal member secured to each of said clamps and to a respective handle part.

17. A combination holder as set forth in claim 16 wherein one of said metal members is fixedly secured to its respective clamp and is removably securable to its respective handle part so as to enable this last-said clamp to be readily removed from its handle part.

18. A combination holder as set forth in claim 16 or 13 wherein said metal members are of sufficient width so as to function as a heat shield and to reflect heat from the user's hand gripping the handle parts.

* * * * *

UNITED STATES PATENT AND TRADEMARK OFFICE
CERTIFICATE OF CORRECTION

PATENT NO. : 4,237,365
DATED : December 2, 1980
INVENTOR(S) : William S. Lambros et al It is certified that error appears in the above-identified patent and that said Letters Patent are hereby corrected as shown below:

Column 1, line 20, "clap" should read "clamp".
Column 1, line 42, "maintain" should read "maintain".
Column 2, line 4, "arch" should read "arc".
Column 2, line 41, "both the" should read "both of the".
Column 4, line 25, "jaw" should read "jaws".
Column 4, line 26, "release" should read "released".
Column 4, lines 30-31, "electrodes" should read "electrode".
Column 4, line 53, "positioned" should read "positively".
Column 4, line 66, "present" should read "prevent".
Column 5, line 9, "removable" should read "removably".
Column 5, line 14, "know" should read "knob".
Column 5, line 59, "fingers toward" should read "fingers facing toward".
Column 6, line 3, "to work" should read "to a work".
Column 8, line 28 "as set" should read "holder as set".

Signed and Sealed this

First Day of September 1981

[SEAL]

Attest:

Attesting Officer

GERALD J. MOSSINGHOFF
Commissioner of Patents and Trademarks